(12) United States Patent
Chandel et al.

(10) Patent No.: US 11,558,710 B2
(45) Date of Patent: Jan. 17, 2023

(54) REAL-TIME MONITORING OF PROXIMITY BETWEEN A PLURALITY OF COMPUTING DEVICES

(71) Applicant: Tata Consultancy Services Limited, Mumbai (IN)

(72) Inventors: Vivek Chandel, Gurgaon (IN); Snehasis Banerjee, Kolkata (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 101 days.

(21) Appl. No.: 17/178,081

(22) Filed: Feb. 17, 2021

(65) Prior Publication Data
US 2022/0086597 A1 Mar. 17, 2022

(30) Foreign Application Priority Data
Sep. 13, 2020 (IN) ............................. 202021039568

(51) Int. Cl.
*H04W 4/02* (2018.01)
*H04B 17/318* (2015.01)
*H04Q 9/00* (2006.01)

(52) U.S. Cl.
CPC .......... *H04W 4/023* (2013.01); *H04B 17/318* (2015.01); *H04Q 9/00* (2013.01)

(58) Field of Classification Search
CPC ....... H04W 4/023; H04B 17/318; H04Q 9/00; H04Q 2209/00; H04Q 2209/20; H04Q 2209/40; H04Q 2209/43
See application file for complete search history.

(56) References Cited

U.S. PATENT DOCUMENTS

| | | | |
|---|---|---|---|
| 8,660,490 B2 * | 2/2014 | Cattuto | G01S 5/0252 370/252 |
| 10,003,913 B2 * | 6/2018 | Jin | H04W 4/025 |

(Continued)

OTHER PUBLICATIONS

Ta, Viet-Cuong et al., "Smartphone-based user positioning in a multiple-user context with Wi-Fi and Bluetooth", International Conference on Indoor Positioning and Indoor Navigation (IPIN), Sep. 2018, Research Gate, https://www.researchgate.net/publication/326415527_Smartphone-Based_User_Positioning_in_a_Multiple-User_Context_with_Wi-Fi_and_Bluetooth/link/5b4c5bff45851519b4c08474/download.

(Continued)

*Primary Examiner* — Franklin D Balseca
(74) *Attorney, Agent, or Firm* — Finnegan, Henderson, Farabow, Garrett & Dunner LLP

(57) ABSTRACT

Conventionally, Received Signal Strength Indicator (RSSI)-based solutions have been extensively devised in the domains of indoor localization and context-aware applications. These solutions are primarily based on a path-loss attenuation model, with customizations on RSSI processing and are usually regression-based. Further, existing solutions for distance and proximity estimation incorporate data features derived only from the RSSI values themselves with additional features like frequency of occurrence of certain RSSI values thus are less accurate. Present disclosure provides systems and methods that implement a classification model that uses RSSI as well as temporal features derived from the received data packets. The model uses data from multiple devices in different environments for training and can execute proximity decisions on the device itself. The method of the present disclosure monitoring proximity between a plurality of devices implements/uses an effective protocol for decision aggregation to suppress false positive (Continued)

proximity events generated and further stabilizes device's response.

15 Claims, 8 Drawing Sheets

(56) References Cited

U.S. PATENT DOCUMENTS

| | | | | |
|---|---|---|---|---|
| 11,148,042 B2 * | 10/2021 | Tobin | ............... | A63F 13/216 |
| 2021/0295662 A1 * | 9/2021 | Bugbee | ............ | G08B 21/22 |

OTHER PUBLICATIONS

Ng, Pai Chet et al., "COVID-19 and your smartphone: BLE based smart contact tracing", Computer Science, May 2020, ARXIV, https://arxiv.org/pdf/2005.13754.pdf.

* cited by examiner

REAL-TIME MONITORING OF PROXIMITY BETWEEN A PLURALITY OF COMPUTING DEVICES

PRIORITY CLAIM

This U.S. patent application claims priority under 35 U.S.C. § 119 to: India Application No. 202021039568, filed on Sep. 13, 2020. The entire contents of the aforementioned application are incorporated herein by reference.

TECHNICAL FIELD

The disclosure herein generally relates to proximity monitoring techniques, and, more particularly, to real-time monitoring of proximity between a plurality of computing devices.

BACKGROUND

In the wake of recent (COVID-19) pandemic, contact tracing has turned out to be an indispensable technique to help administrative authorities contain localized infections efficiently. In the absence of a definitive and an official vaccine for the infection, practicing social distancing has proved to be an effective norm to prevent the risk of infection. RSSI-based solutions have been extensively devised in the domains of indoor localization and context-aware applications. These solutions are primarily based on a path-loss attenuation model, with customizations on RSSI (Received Signal Strength Indicator) processing and are usually regression-based. Further, existing solutions for distance and proximity estimation incorporate data features derived only from the RSSI values themselves with additional features like frequency of occurrence of certain RSSI values thus are less accurate.

SUMMARY

Embodiments of the present disclosure present technological improvements as solutions to one or more of the above-mentioned technical problems recognized by the inventors in conventional systems. For example, in one aspect, there is provided a processor implemented method for real-time monitoring of proximity between a plurality of computing devices. The method comprises continually transmitting in real-time, by a primary computing device, one or more data packets, via a communication channel; continually receiving in real-time, by the primary computing device, a unique sequence of data packets from one or more secondary computing devices; identifying in real-time, by the primary computing device, (i) a Received Signal Strength Indicator (RSSI) and (ii) a time difference (TD) between arrival instances of a current data packet and a previous data packet comprised in the continually received sequence of data packets from the one or more secondary computing devices; computing in real-time, by the primary computing device, a plurality of statistical features based on the identified RSSI and the TD; creating in real-time, by the primary computing device, a feature vector using the one or more computed statistical features; and classifying in real-time based on the feature vector, via a pre-trained binary classifier comprised in the primary computing device, each of the one or more secondary computing devices as a computing device that is either within a proximity of the primary computing device or outside of the proximity of the primary computing device.

In an embodiment, the one or more statistical features comprise one or more RSSI based statistical features, and one or more temporal statistical features.

In an embodiment, the RSSI based statistical features comprise at least one of (i) an average value, (ii) a standard deviation, (iii) a minimum value, (iv) a maximum value, and (v) a median value of the RSSI of the one or more data packets belonging to a specific time window corresponding to the one or more secondary computing devices.

In an embodiment, the one or more temporal based statistical features comprise at least one of (i) an average value, (ii) a standard deviation, (iii) a minimum value, (iv) a maximum value, and (v) a median value of the time difference between arrival instances of a current data packet and a previous data packet belonging to a specific time window corresponding to the one or more secondary computing devices.

In an embodiment, the proximity corresponds to a physical presence of the one or more secondary computing devices within a pre-defined radius of the primary computing device.

In another aspect, there is provided a computing device for real-time monitoring of proximity between a plurality of computing devices. The computing device comprises: a memory storing instructions; one or more communication interfaces; and one or more hardware processors coupled to the memory via the one or more communication interfaces, wherein the one or more hardware processors are configured by the instructions to: continually transmit in real-time one or more data packets, via a communication channel; continually receive in real-time a unique sequence of data packets from one or more devices; identify in real-time (i) a Received Signal Strength Indicator (RSSI) and (ii) a time difference (TD) between arrival instances of a current data packet and a previous data packet comprised in the continually received sequence of data packets from the one or more devices; compute in real-time a plurality of statistical features based on the identified RSSI and the TD; create in real-time a feature vector using the one or more computed statistical features; and classify in real-time based on the feature vector, via a pre-trained binary classifier comprised in the computing device, each of the one or more devices as a device that is either within a proximity of the computing device or outside of the proximity of the computing device.

In an embodiment, the one or more statistical features comprise one or more RSSI based statistical features, and one or more temporal statistical features.

In an embodiment, the RSSI based statistical features comprise at least one of (i) an average value, (ii) a standard deviation, (iii) a minimum value, (iv) a maximum value, and (v) a median value of the RSSI of the one or more data packets belonging to a specific time window corresponding to the one or more devices.

In an embodiment, the one or more temporal based statistical features comprise at least one of (i) an average value, (ii) a standard deviation, (iii) a minimum value, (iv) a maximum value, and (v) a median value of the time difference between arrival instances of a current data packet and a previous data packet belonging to a specific time window corresponding to the one or more devices.

In an embodiment, the proximity corresponds to a physical presence of the one or more devices within a pre-defined radius of the computing device.

In yet another aspect, there is provided a computer program product comprising a non-transitory computer readable medium having a computer readable program embodied therein, wherein the computer readable program, when executed on a computing device causes the computing device to perform a processor implemented method for real-time monitoring of proximity between a plurality of computing devices comprising: continually transmitting in real-time, by a primary computing device, one or more data packets, via a communication channel; continually receiving in real-time, by the primary computing device, a unique sequence of data packets from one or more secondary computing devices; identifying in real-time, by the primary computing device, (i) a Received Signal Strength Indicator (RSSI) and (ii) a time difference (TD) between arrival instances of a current data packet and a previous data packet comprised in the continually received sequence of data packets from the one or more secondary computing devices; computing in real-time, by the primary computing device, a plurality of statistical features based on the identified RSSI and the TD; creating in real-time, by the primary computing device, a feature vector using the one or more computed statistical features; and classifying in real-time based on the feature vector, via a pre-trained binary classifier comprised in the primary computing device, each of the one or more secondary computing devices as a computing device that is either within a proximity of the primary computing device or outside of the proximity of the primary computing device.

In an embodiment, the one or more statistical features comprise one or more RSSI based statistical features, and one or more temporal statistical features.

In an embodiment, the RSSI based statistical features comprise at least one of (i) an average value, (ii) a standard deviation, (iii) a minimum value, (iv) a maximum value, and (v) a median value of the RSSI of the one or more data packets belonging to a specific time window corresponding to the one or more secondary computing devices.

In an embodiment, the one or more temporal based statistical features comprise at least one of (i) an average value, (ii) a standard deviation, (iii) a minimum value, (iv) a maximum value, and (v) a median value of the time difference between arrival instances of a current data packet and a previous data packet belonging to a specific time window corresponding to the one or more secondary computing devices.

In an embodiment, the proximity corresponds to a physical presence of the one or more secondary computing devices within a pre-defined radius of the primary computing device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
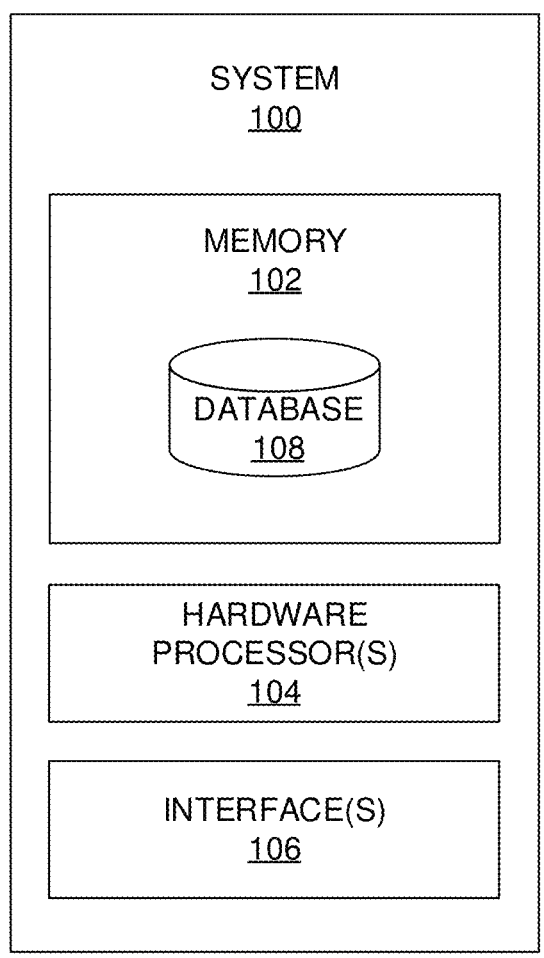
FIG. 1 depicts a system for real-time monitoring of proximity between a plurality of computing devices, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Since the surfacing of initial cases of COVID-19, the pandemic has been spreading around the world in an unprecedented manner with over 16.5 million confirmed cases worldwide as at the time of writing. With little to no preparation for managing such a large-scale contagion, human lives, and economies of almost every country in the world have suffered severely. Asymptomatic spread of the infection, along with varying incubation period of the virus has been one of the biggest hurdles in containing the spread of infection. Without the availability of a viable vaccine for the virus, a sudden change in lifestyle norms has been triggered, and administrative decisions like closing of places of mass gatherings, e.g., movie theatres, malls, gymnasiums, office campuses etc. have been executed after establishment of the fact that the virus can spread from one person to another in the near vicinity. In this situation, keeping a minimum inter-personal distance ubiquitously is the only effective way to prevent the spread of the virus today.

The norm of 'social distancing' has been adopted widely, with the minimum safe distance between two individuals suggested to be 6 feet (~2 m), although there are recent studies claiming that the airborne spread of the virus can go far beyond this threshold distance. Countries across the world have, to varying degrees of success, implemented solutions to trace the chains of infection, and have enforced strict quarantine protocols on selected citizens, especially those arriving from abroad. Smartphones have come out to be the primary sensing devices in these solutions due to their pervasiveness and rich set of onboard sensors like BLE (Bluetooth Low Energy), GPS etc. BLE-based solutions (Aarogya Setu app by India's MeitY, MyTrace by Malaysia's MOH, BlueTrace based Singapore government's TraceTogether and Australian Government's COVIDSafe, etc. to name a few) work on the principle of estimating proximity using variation of RSSI (Received Signal Strength Indicator) of the scanned Bluetooth® packets with distance between the sending (advertising) and the receiving (scanning) device. All these solutions have a similar operational protocol too, with the user's device scanning for other devices in the vicinity using onboard BLE and storing the information about the devices found. This information is shared with the official health authorities in case the user is found to be COVID-19 positive, so that the sets of at-risk population can be isolated. Social distancing norm with an active use of mobile tracing apps, is expected to be generally followed by the users, enforcement of which is at the sole discretion of the user, although their use is mandated in certain situations, e.g. while travelling. App-based solutions mentioned above focus on working with the proximity data after a COVID-19 positive case is detected and warn the potentially at-risk users who might have come in contact with the positive case.

Present disclosure provides systems and methods for monitoring proximity between a plurality of device. In addition to performing contact tracing, present disclosure enables reduction of the chance of acquiring the infection by creating interventions at the social distancing stage itself, where a fixed group of population needs to be monitored in a certain geographical zone/area (office campus, factory, quarantine centers, and the like). To ensure social distancing, the system should be able to classify as to whether the other device is present within a particular physical distance using the BLE interface as discussed above. More specifically, present disclosure, its system and method implement a classification model that uses Received Signal Strength Indicator (RSSI) as well as temporal features derived from the received data packets. The model uses data from multiple devices in different environments for training and can execute proximity decisions on the device itself. The method of the present disclosure monitoring proximity between a plurality of devices implements/uses an effective protocol for decision aggregation to suppress the false positive proximity events generated and further stabilizes device's response. Maintaining continuous social distancing consciously is a challenging task for humans. Hence, present disclosure, its system and methods provide real-time alerts to the user in case a proximity event is generated, which can serve as a reminder to the user for ensuring that they are following proper distancing norms. Such intervention can assist in keeping the users away from the infection, thereby helping in suppressing the infection's spread and boosting the overall safety. The alert notifications are generated with a unique sound and vibration pattern on the mobile device to draw user's attention.

In addition to helping the enforcement of social distancing, the system and method of the present disclosure can be used as an end to end solution for contact tracing, with an integrated server framework, where the authorities (government and private entities) can monitor the proximity graphs of the users and trace the spread of any possible infection up-to a desired social connectivity level. The present disclosure and its system and method provide the following technical advancement in light of conventional approaches/systems:

1. Real-time alerts on the computing device in the form of onscreen notifications coupled with unique sound/vibration pattern in case social distancing is violated with any of the devices nearby.
2. A machine learning approach for making strong on-device proximity decisions with use of temporal features of data packets, along with RSSI to boost the accuracy.
3. Use of decision aggregation on the system and pruning dissymmetric proximity events on the server to further reduce false positives and enhance the stability of proximity event generation.

Referring now to the drawings, and more particularly to FIGS. 1 through 4C, where similar reference characters denote corresponding features consistently throughout the figures, there are shown preferred embodiments and these embodiments are described in the context of the following exemplary system and/or method.

FIG. 1 depicts a system 100 for real-time monitoring of proximity between a plurality of computing devices, in accordance with an embodiment of the present disclosure. In an embodiment, the system 100 may also be referred as a computing device, a device, or a primary computing device and may be interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on one or more data packets being continually transmitted by the system 100 to other devices/systems. The database 108 further stores information such as (i) unique sequence of data packets from one or more secondary computing devices, (ii) a Received Signal Strength Indicator (RSSI) and (ii) a time difference (TD) between arrival instances of a current data packet and a previous data packet comprised in the continually received sequence of data packets from the one or more secondary computing devices; a plurality of statistical features based on the identified RSSI and the TD; a feature vector computed for the one or more computed statistical features, details of classification of secondary computing device, and the like.

The database 108 further stores various techniques such as feature vector generating technique(s), classification technique(s) as known in the art, and the like. The above-mentioned techniques and the models comprised in the memory 102/database 108 are invoked and executed as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
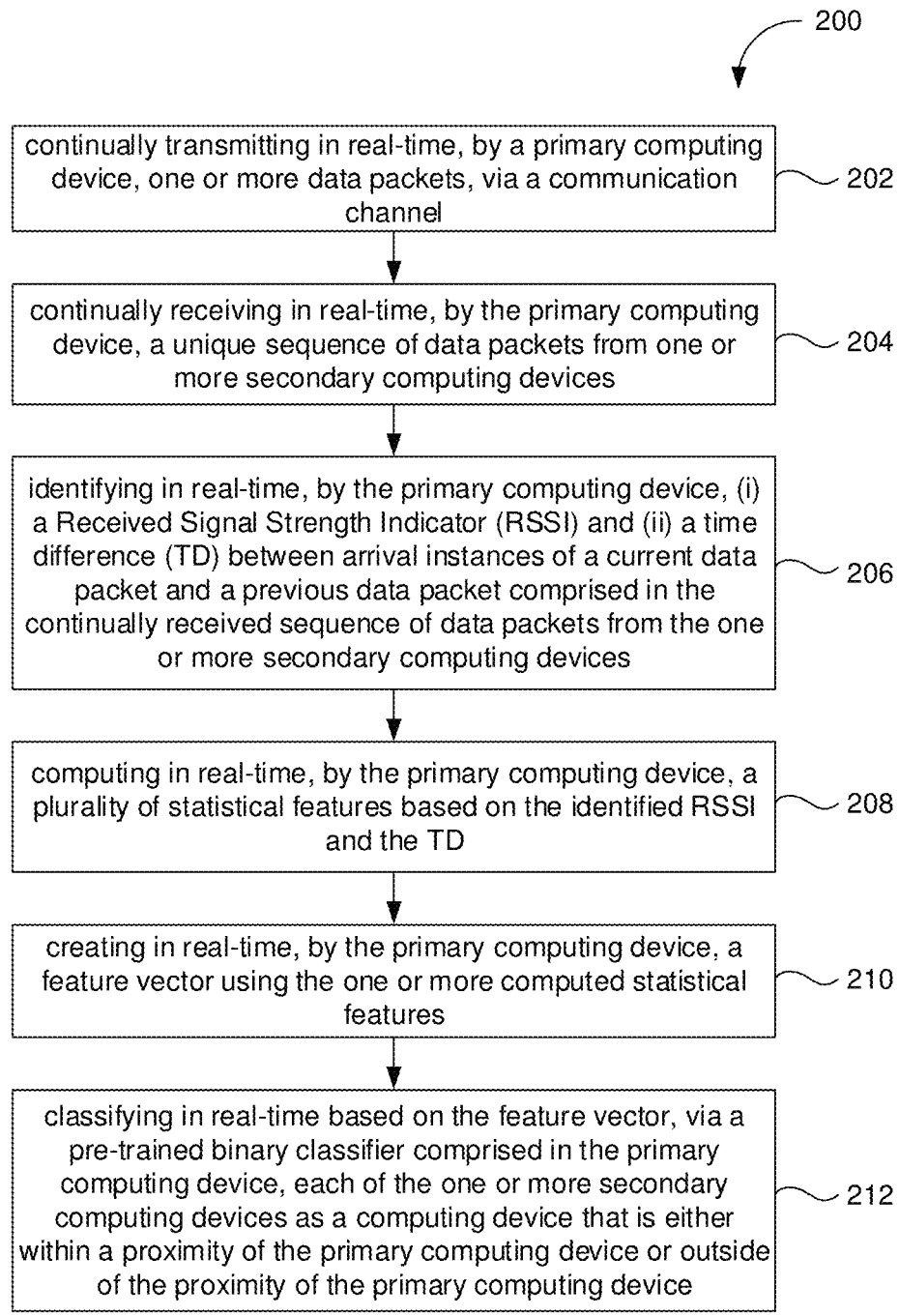
FIG. 2 depicts an exemplary flow chart illustrating a processor implemented method for real-time monitoring of proximity between a plurality of computing devices, using the system of FIG. 1, in accordance with an embodiment of the present disclosure.

FIG. 2, with reference to FIG. 1, depicts an exemplary flow chart illustrating a processor implemented method 200 for real-time monitoring of proximity between a plurality of computing devices, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment of the present disclosure, the system 100 serves as a primary computing device. In an embodiment, at step 202 of the present disclosure, the one or more hardware processors 104 of the primary computing device continually transmit, in real-time, one or more data packets, via a communication channel. The one or more data packets comprise one or more Bluetooth® Low Energy (BLE) data packets, wireless data packets, and the like. In an embodiment, the one or more data packets may be transmitted as a combination of one or more Bluetooth® Low Energy (BLE) data packets, wireless data packets, and the like. The communication channel may comprise, but is not limited to, a Bluetooth® communication channel, a Wi-Fi communication channel, a near field communication (NFC) channel, and the like.

In an embodiment, at step 204 of the present disclosure, the one or more hardware processors 104 of the primary computing device continually receive, in real-time, a unique sequence of data packets from one or more secondary computing devices. In an embodiment of the present disclosure, the one or more secondary computing devices may be referred as one or more devices and interchangeably used herein. In an embodiment of the present disclosure, the primary computing device and the one or more secondary computing devices may be at least one of laptop computers, notebooks, hand-held devices (e.g., mobile communication device such as smart phones, tablet/tablet computer, radio, etc.), workstations, mainframe computers, and the like.

In an embodiment, at step 206 of the present disclosure, the one or more hardware processors 104 of the primary computing device identify in real-time, (i) a Received Signal Strength Indicator (RSSI) and (ii) a time difference (TD) between arrival instances of a current data packet and a previous data packet comprised in the continually received sequence of data packets from the one or more secondary computing devices. The above steps 202 till 206 are better understood by way of following exemplary explanation/description:

The system 100 (or primary computing device or device) uses wireless capability of the primary computing device to advertise the device itself. On the primary computing device $D_i$, periodic packets can be transmitted, with every packet containing an identifier (ID) of the primary computing device $D_j$, which is $I_j$. Let the advertisement data packets transmitted periodically from the primary computing device $D_j$ be represented as $P_1, P_2, P_3, \ldots P_k, P_{k+1}$ (refer step 202). Further, the primary computing device $D_j$ acts as a receiver for incoming advertisement packets from the one or more secondary primary devices in the vicinity and reachable wirelessly. The data packets from all the one or more secondary computing devices are accumulated in independent queues, with every detected device (e.g., a secondary computing device) has its own queue of advertisement packets. Henceforth, all the processing shall be discussed from the perspective of a single scanning device (e.g., a computing device or the primary computing device 100) $D_i$, which can also be called as the "host device" and interchangeably uses herein. Let the queues on the device host device $D_i$ be defined as $Q_j$, $Q_{j+1}$, and so on, one queue for each of the detected devices $D_j$, $D_{j+1}$ and so on. Henceforth, packet list $P_1, P_2, P_3, \ldots, P_k, P_{k+1}$, and so on shall represent data packets received from detected device $D_j$ and scanned by the host device $D_i$. Hence, $Q_j = P_1, P_2, P_3, P_k, P_{k+1}$ (refer step 204).

From each of the above data packets, (i) the Received Signal Strength Indicator (RSSI) and (ii) the time difference (TD) between arrival instances of a current data packet and a previous data packet comprised in the continually received sequence of data packets from the one or more secondary computing devices are identified by the primary computing device. Below Table 1 depicts RSSI and arrival instance of a current data packet and a previous data packet comprised in the continually received sequence of data packets from the one or more secondary computing devices.

TABLE 1

| First secondary computing device (D1) | | Second secondary computing device (D2) | | Third secondary computing device (D3) | |
|---|---|---|---|---|---|
| Time (arrival instance) | RSSI | Time (arrival instance) | RSSI | Time (arrival instance) | RSSI |
| 12501 | −95 | 4059 | −77 | 2491 | −88 |
| 12727 | −91 | 4345 | −74 | 2750 | −76 |
| 13024 | −94 | 4632 | −73 | 3016 | −91 |
| 13254 | −93 | 4914 | −73 | 3277 | −75 |
| 13478 | −94 | 5200 | −73 | 3544 | −98 |
| 14430 | −94 | 5480 | −72 | 3802 | −90 |
| 14675 | −96 | 5773 | −71 | 4065 | −87 |
| 15514 | −96 | 6065 | −73 | 4320 | −77 |
| 16097 | −96 | 6638 | −82 | 4582 | −88 |
| 16339 | −92 | 6922 | −82 | 4836 | −78 |

Every packet $P_k$ received from the detected device $D_j$ (one or more secondary computing devices) has two properties: (i) RSSI, which is the signal strength of the packet when received on the host device (primary computing device), and (ii) TD (also referred as dT and interchangeably used herein), which is the time difference between arrival instants of the current data packet and the previous data packet as received on the host device (primary computing device). These properties for a particular packet $P_k$ can be expressed as $RSSI_k$, and $dT_k$ respectively. Set of RSSI and dT properties for all the packets for a window $W_k$ can be expressed as $RSSI(W_k)$ and $dT(W_k)$ respectively. Hence, $RSSI(W_k)=\{RSSI_k, RSSI_{k+1}, \ldots \}$ and $dT(W_k)=\{dT_k, dT_{k+1}, \ldots \}$.

Referring to steps of FIG. 2, at step 208 of the present disclosure, the one or more hardware processors 104 of the primary computing device 100 compute, in real-time, a plurality of statistical features based on the identified RSSI and the TD (dT). The one or more statistical features comprise one or more RSSI based statistical features, and one or more temporal statistical features, in an embodiment of the present disclosure.

The above step 208 is better understood by way of following exemplary explanation/description. For sake of brevity and better understanding of the embodiments of the present disclosure, system and method associated described herein have considered data from only the last 5 rows (e.g., entries) of each device D1, D2 and D3 from the above Table 1. In other words, entries in the last five rows of Table 1 serve as one data window for each of the secondary computing devices (D1, D2, and D3) respectively.

At first, information or data from the received chronological collection of advertisement data packets from a device to a near/far decision is transformed. To effect such transformation, a mathematical model 'M' may be used. Packet list from the queue $Q_j$ can be collected in packet windows of pre-defined length 'm' and the collection can be fed to the model M to create a single near/far decision on the host device $D_i$ (e.g., primary computing device) with respect to the detected device $D_j$ (e.g., one or more secondary computing devices). Let the collection of packets (packet window), starting from packet $P_k$ be represented as $W_k=\{P_k, P_{k+1}, \ldots, P_{k+m-1}\}$.

For a window $W_k$, a set of features can be calculated using the constituent packets of $W_k$. These features may include one or more statistical features pertaining to the properties of the data packets ('RSSI' and 'dT'). Various statistical functions for a window can be expressed as following:

1. RSSI-based features:
   a) mean $RSSI(W_k)$: average value of 'RSSI' of all the data packets belonging to the window $W_k$.
   b) std $RSSI(W_k)$: standard deviation of 'RSSI' of all the data packets belonging to the window $W_k$.
   c) min $RSSI(W_k)$: a minimum value of 'RSSI' of all the data packets belonging to the window $W_k$.
   d) max $RSSI(W_k)$: a maximum value of 'RSSI' of all the data packets belonging to the window $W_k$.
   e) median $RSSI(W_k)$: a median value of 'RSSI' of all the data packets belonging to the window $W_k$.

In other words, the RSSI based statistical features comprise at least one of (i) an average value, (ii) a standard deviation, (iii) a minimum value, (iv) a maximum value, and (v) a median value of the RSSI of the one or more data packets belonging to a specific time window corresponding to the one or more secondary computing devices.

2. Temporal features:
   a) mean $dT(W_k)$: average value of 'dT' of all the data packets belonging to the window $W_k$.
   b) std $dT(W_k)$: standard deviation of 'dT' of all the data packets belonging to the window $W_k$.
   c) min $dT(W_k)$: a minimum value of 'dT' of all the data packets belonging to the window $W_k$.
   d) max $dT(W_k)$: a maximum value of 'dT' of all the data packets belonging to the window $W_k$.
   e) median $dT(W_k)$: a median value of 'dT' of all the data packets belonging to the window $W_k$.

In other words, the one or more temporal based statistical features comprise at least one of (i) an average value, (ii) a standard deviation, (iii) a minimum value, (iv) a maximum value, and (v) a median value of the time difference between arrival instances of a current data packet and a previous data packet belonging to a specific time window corresponding to the one or more secondary computing devices. The above step 208 may be better understood by way of following examples depicted in Table 2.

TABLE 2

| First secondary computing device (D1) | | Second secondary computing device (D2) | | Third secondary computing device (D3) | |
|---|---|---|---|---|---|
| dT | Normalized RSSI | dT | Normalized RSSI | dT | Normalized RSSI |
| 0.952 | 0.15 | 0.28 | 0.7 | 0.258 | 0.25 |
| 0.245 | 0.1 | 0.293 | 0.725 | 0.263 | 0.325 |
| 0.839 | 0.1 | 0.292 | 0.675 | 0.255 | 0.575 |
| 0.583 | 0.1 | 0.573 | 0.45 | 0.262 | 0.3 |
| 0.242 | 0.2 | 0.284 | 0.45 | 0.254 | 0.55 |

At step 210 of the present disclosure, the one or more hardware processors 104 of the primary computing device 100 create, in real-time, a feature vector using the one or more computed statistical features. For a window $W_k$, the feature vector can be expressed as a collection of statistical features from both 'RSSI' and 'dT' of the packets. A feature vector $F_k$ for window $W_k$ including but not limited to all the function values defined above may be expressed by way of following example:

$F_k=\{$mean $RSSI(W_k)$, std $RSSI(W_k)$, min $RSSI(W_k)$, max $RSSI(W_k)$, median $RSSI(W_k)$, mean $dT(W_k)$, std $dT(W_k)$, min $dT(W_k)$, max $dT(W_k)$, median $dT(W_k)\}$.

As mentioned above, with the data from Table 2 serving as input to the primary computing device, a feature vector using the one or more computed statistical features for each of the devices D1, D2 and D3 wherein the feature vector is been depicted in Table 3 below by way of examples:

TABLE 3

| Feature vector for first secondary computing device (D1) | | Feature vector for second secondary computing device (D2) | | Feature vector for third secondary computing device (D3) | |
|---|---|---|---|---|---|
| dT features | RSSI features | dT features | RSSI features | dT features | RSSI features |
| 0.57 | 0.13 | 0.34 | 0.60 | 0.26 | 0.40 |
| 0.24 | 0.10 | 0.28 | 0.45 | 0.25 | 0.25 |
| 0.95 | 0.20 | 0.57 | 0.73 | 0.26 | 0.58 |
| 0.58 | 0.10 | 0.29 | 0.68 | 0.26 | 0.33 |
| 0.33 | 0.04 | 0.13 | 0.14 | 0.00 | 0.15 |

At step 212 of the present disclosure, the one or more hardware processors 104 of the primary computing device 100 classify, in real-time based on the feature vector, via a pre-trained binary classifier comprised in the primary computing device, each of the one or more secondary computing devices (e.g., D1, D2, D3 and so on) as a computing device that is either within a proximity of the primary computing device or outside of the proximity of the primary computing device. The proximity corresponds to a physical presence of the one or more secondary computing devices within a pre-defined radius of the primary computing device (e.g., say a secondary computing device such as D1 is either within or outside a radius of say 2 meters with respect to the primary computing device say D). In the present disclosure, the system and method used a threshold distance of dt=2 m for making the 'near/far' binary decision among a pair of devices. It should be noted that this distance can be configured as per the specified social distancing standard, in one example embodiment of the present disclosure.

The feature vector $F_k$ is transformed to a near/far decision, $X_k$ by a mathematical model 'M' (also referred as the binary classifier):

$$M(F_k)=X_k \qquad (1)$$

where $X_k$ can be either near, or far. It is noted that novel addition of temporal features in addition to RSSI-based features increases the accuracy of mathematical model in transforming the feature vectors to near/far decision (e.g., refer FIGS. 3A through 4C).

As mentioned above, there may be a mathematical model 'M' which is pre-trained as described below. This model M can leverage techniques such as decision trees, or a nearest neighbor classification or any other instance-based classification algorithm to transform the feature vector $F_k$ to one of the 'near' or 'far' class. A classification model takes the input as the feature vector $F_k$, e.g., the features for a window of device D1 (e.g., one of the secondary primary devices) as depicted in Table 3 which is actually present at 3 m distance from the scanning device (e.g., the primary computing device 100). Hence, $F_k=\{0.57, 0.24, 0.95, 0.58, 0.33, 0.13, 0.10, 0.20, 0.10, 0.04\}$, and the model M (or the binary classifier) gives output as '0' denoting 'far'. Similarly, for device D2 (e.g., one of the secondary primary devices) in Table 3 which is present at $1m$ distance from the scanning device (e.g., the primary computing device 100). Hence, $F_k=\{0.34, 0.28, 0.57, 0.29, 0.13, 0.60, 0.45, 0.73, 0.68, 0.14\}$, and the model gives output as '1' denoting 'near'. In order to make this decision, a nearest-neighbor model can compare $F_k$ (or the feature vector serving as output from step 210) to training vectors (also referred as trained feature vector of pre-trained binary classifier) already available with the model by calculating a distance metric. In other words, the feature vector of each of the one or more secondary computing devices is compared with a training (or trained feature vector) comprised in the memory 102 for classifying each of the one or more secondary computing devices as a computing device that is either within a proximity of the primary computing device or outside of the proximity of the primary computing device. Output can then be provided as the majority class of the training vectors to which $F_k$ is at a smallest distance. Similarly, for decision tree classifiers, the pre-trained tree can be created while by calculating the branching thresholds at each level of the tree with the aid of training vectors. Then $F_k$ can be traversed using these thresholds resulting in a final output classification. Depending upon which binary classifier is implemented by the system/primary computing device 100, accordingly training feature vectors are created or generated during the training of the binary classifier, wherein the training feature vectors are utilized for comparison with feature vectors created during a proximity monitoring between the plurality of devices in real-world scenarios.

Figure 3A:
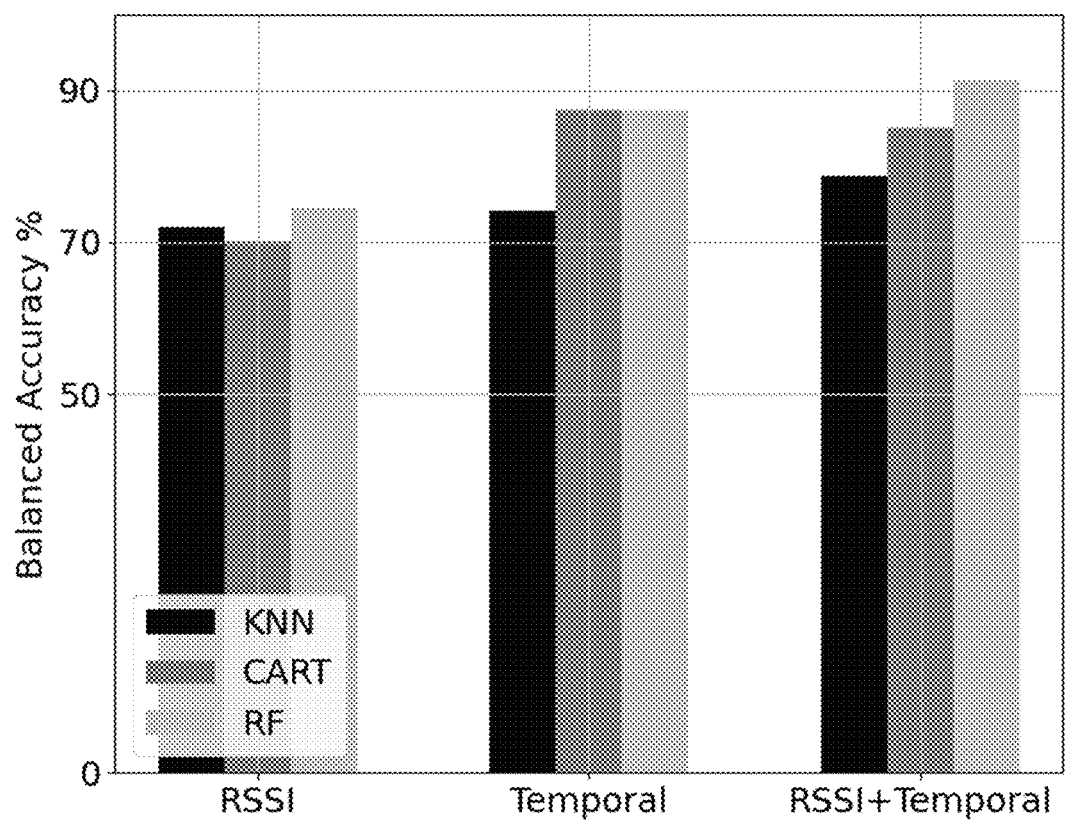
FIG. 3A depicts a graphical representation illustrating accuracy of various mathematical models created using a training vector obtained from a first environment (e.g., office), in accordance with an embodiment of the present disclosure.
Figure 3B:
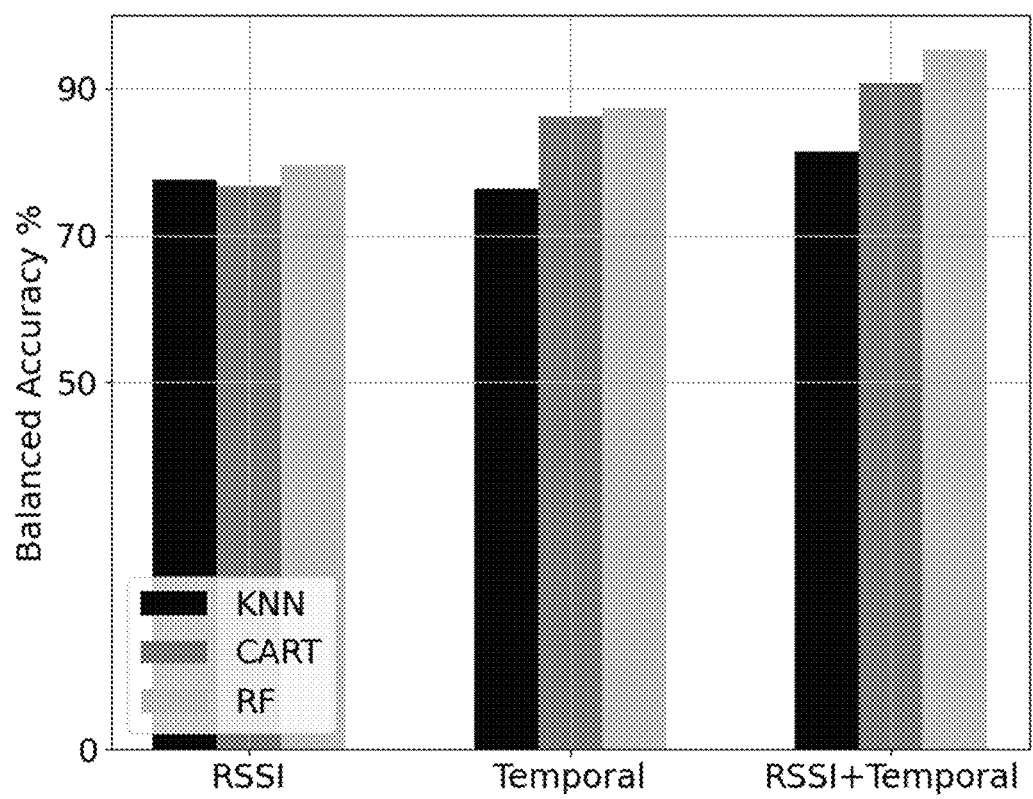
FIG. 3B depicts a graphical representation illustrating accuracy of the various mathematical models created using a training vector obtained from a second environment (e.g., home) that is different from the first environment, in accordance with an embodiment of the present disclosure.
Figure 3C:
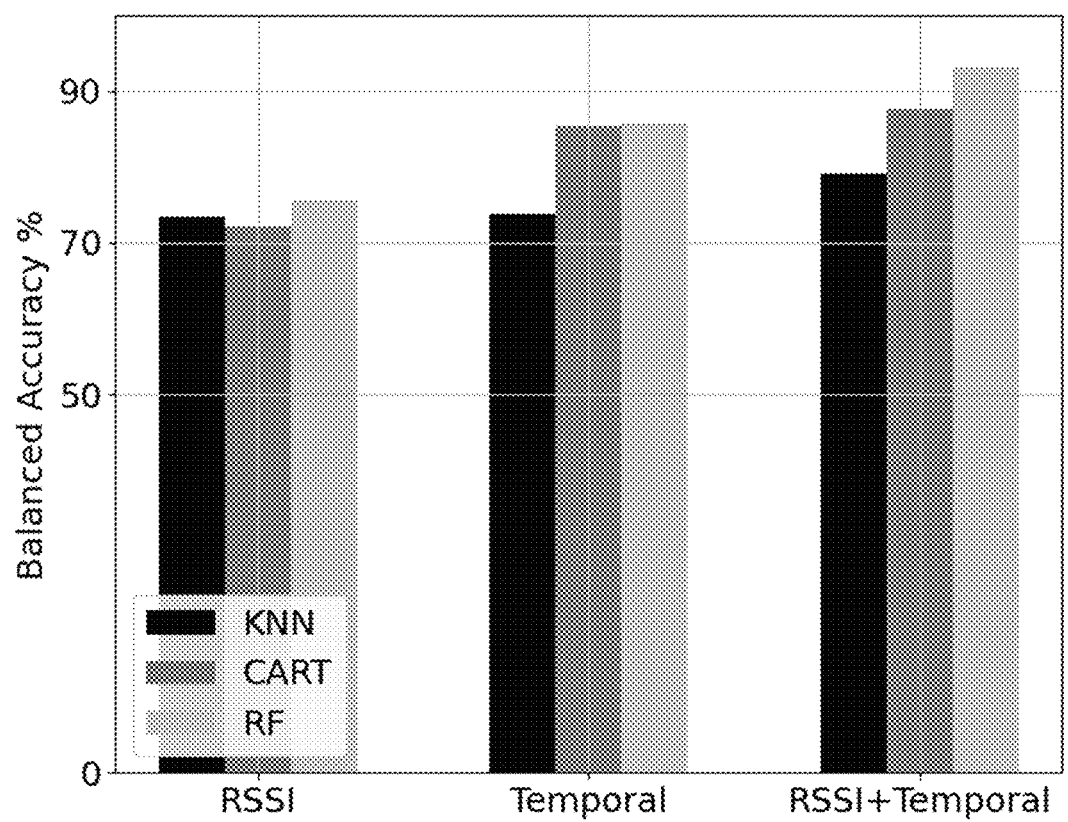
FIG. 3C depicts a graphical representation illustrating accuracy of various mathematical models created using a training vector obtained from a third environment (e.g., combination of home, office, and like), in accordance with an embodiment of the present disclosure.

FIGS. 3A through 3C, with reference to FIGS. 1 through 2, depict graphical representations accuracy of various mathematical models created using training vectors collected from different environments, in accordance with an embodiment of the present disclosure. More specifically, FIG. 3A, with reference to FIGS. 1 through 2, depicts a graphical representation illustrating accuracy of various mathematical models created using a training vector obtained from a first environment (e.g., office), in accordance with an embodiment of the present disclosure. FIG. 3B, with reference to FIGS. 1 through 3A, depicts a graphical representation illustrating accuracy of various mathematical models created using a training vector obtained from a second environment (e.g., home) that is different from the first environment, in accordance with an embodiment of the present disclosure. FIG. 3C, with reference to FIGS. 1 through 3B, depicts a graphical representation illustrating accuracy of various mathematical models created using a training vector obtained from a third environment (e.g., combination of home, office, and like), in accordance with an embodiment of the present disclosure. As can be observed from FIGS. 3A through 3C, accuracy increases appreciably when temporal features are also used in addition to RSSI based features.

Figure 4A:
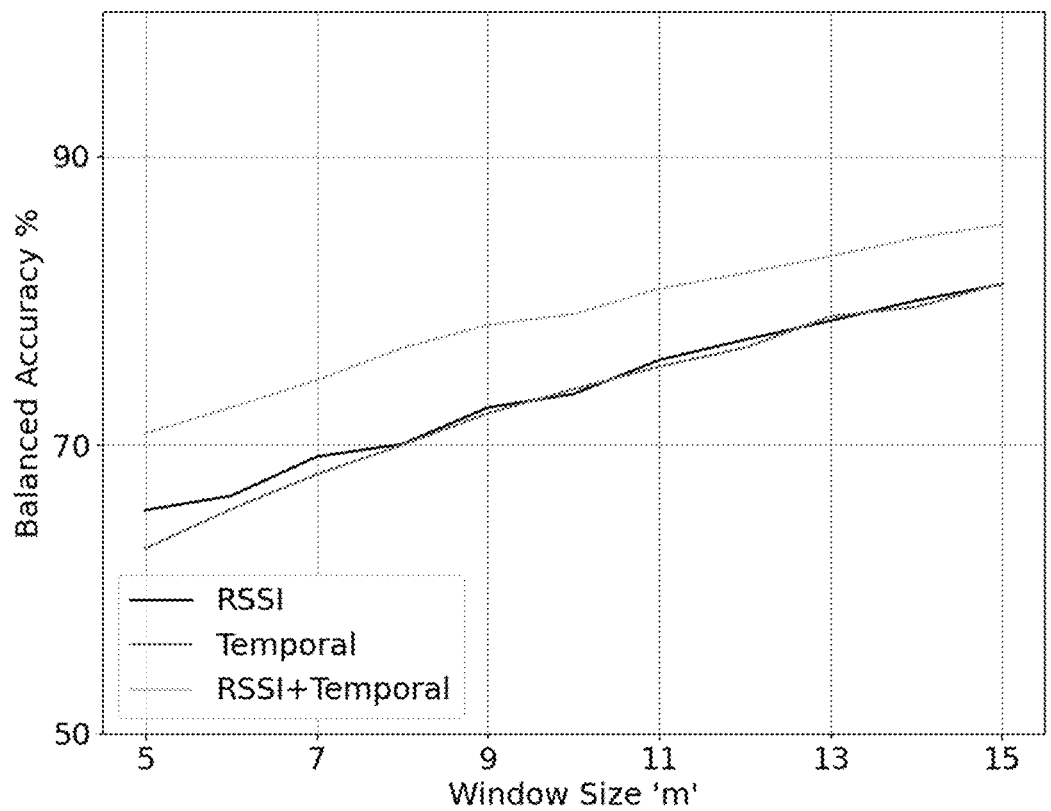
FIG. 4A depicts a graphical representation illustrating accuracy of a first mathematical model (e.g., K Nearest Neighbor being implemented as a binary classifier by the system of FIG. 1) when a data window size 'm' is changed, in accordance with an embodiment of the present disclosure.
Figure 4B:
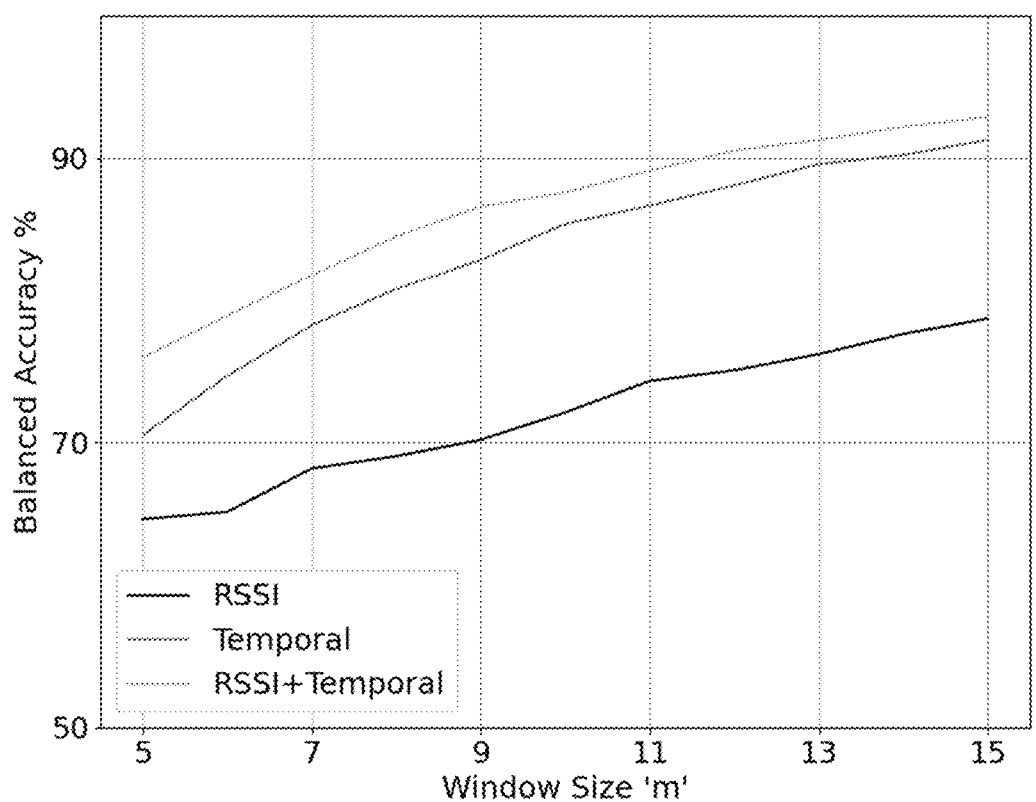
FIG. 4B depicts a graphical representation illustrating accuracy of a second mathematical model (e.g., Classification And Regression Trees (CART) being implemented as a binary classifier by the system of FIG. 1) when the data window size 'm' is changed, in accordance with an embodiment of the present disclosure.
Figure 4C:
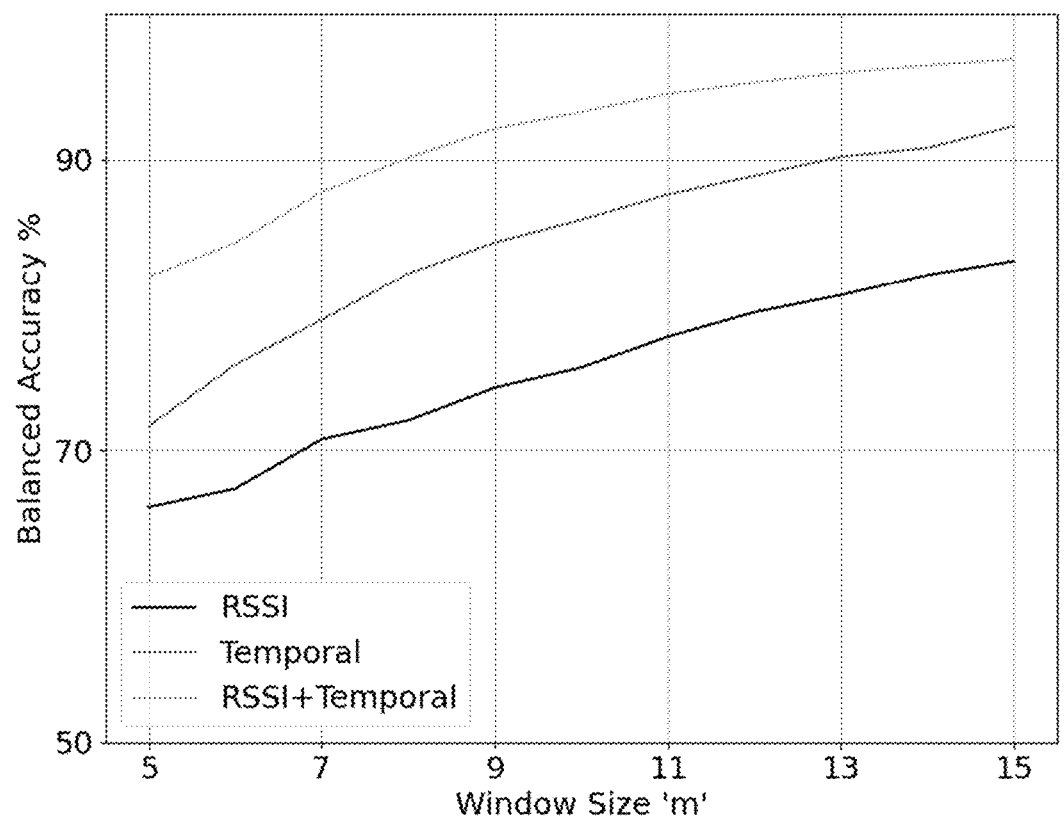
FIG. 4C depicts a graphical representation illustrating accuracy of a third mathematical model (e.g., Random Forrest (RF) being implemented as a binary classifier by the system of FIG. 1) when the data window size 'm' is changed, in accordance with an embodiment of the present disclosure.

FIGS. 4A through 4C, with reference to FIGS. 1 through 3C, depict graphical representations illustrating accuracy of different mathematical models when a data window size 'm' is changed, in accordance with an embodiment of the present disclosure. More specifically, FIG. 4A, with reference to FIGS. 1 through 3C, depicts a graphical representation illustrating accuracy of a first mathematical model (e.g., K Nearest Neighbor being implemented as a binary classifier by the system 100 of FIG. 1) when a data window size 'm' is changed, in accordance with an embodiment of the present disclosure. FIG. 4B, with reference to FIGS. 1 through 4A, depicts a graphical representation illustrating accuracy of a second mathematical model (e.g., Classification And Regression Trees (CART) being implemented as a binary classifier by the system 100 of FIG. 1) when the data window size 'm' is changed, in accordance with an embodiment of the present disclosure. FIG. 4C, with reference to FIGS. 1 through 4B, depicts a graphical representation illustrating accuracy of a third mathematical model (e.g., Random Forrest (RF) being implemented as a binary classifier by the system 100 of FIG. 1) when the data window size 'm' is changed, in accordance with an embodiment of the present disclosure. It can be observed from the FIGS. 4A through 4C, that a collection of RSSI and temporal features yield highest accuracies in all the cases.

The binary classifier (model) is trained with the help of dataset (or data) received from one or more secondary computing devices. More specifically, information on data packets of secondary computing devices D1, D2, D3 may be obtained (e.g., refer Table 1). Such examples shall not be construed as limiting the scope of the present disclosure. Similarly, information comprised in the tables such as Table 2 and Table 3 is fed to the binary classifier (e.g., classifier such as Random Forrest). It is to be understood by a person having ordinary skill in the art or person skilled in the art that such example of binary classifier shall not be construed as limiting the scope of the present disclosure. The above training of model/binary classifier or creation of the model may be better understood by way of following description:

The mathematical model M may be a pre-calculated model which is created using annotated feature vectors (also called the training vectors) using the data collected from various devices and environments, using a ground truth label of near or far for every training vector. This model may be a well-known method of transforming a feature vector to a binary decision (near/far) like a K-Nearest Neighbors classifier, a Random Forest classifier, a CART decision tree, etc. as mentioned above. For model creation, feature vectors $T_i$ (also called the training vectors) along with their annotation of near/far ($A_i$) are fitted to a mathematical function. This function after fitting all the vectors yields 'M' as follows:

$$M = f(\{\{T_1, A_1\}, \{T_2, A_2\}, \{T_3, A_3\}, \ldots\}) \quad (2)$$

where $T_i$ denotes the ith training vector (which is a feature vector with constituent features as defined above), and 'f' denotes the fitting function. This fitting function is well defined for a particular classification model being used (e.g., for K-Nearest Neighbor, Random Forest, etc.). The fitting function equation (2) requires more computation power than the transformation equation (1). Hence, (2) can be processed on a different, more powerful processing machine other than the device itself. Once the fitting function yields the fitted mathematical model 'M', the same can be shifted to the device, where real-time transformation of feature-vectors-to-proximity-decisions can be performed using equation (1).

The training vectors can be generated from data collected at different pre-defined distances between two devices. Let the data be collected at distances $d_1, d_2, d_3, \ldots$ The annotation $A_m$ for any distance $d_n$ can be defined as follows:

$$A_m = \begin{cases} \text{near, if } d_n \leq S_t \\ \text{far, otherwise} \end{cases}$$

Additionally, the system and method of the present disclosure implement an alert mechanism wherein an alert feedback may be communicated to the user/computing device, which may act as a reminder and/or a request for self-verification that the user is not at a physical distance less than the one specified by the administrative authorities ($S_t$). 'p' no. of proximity decisions, starting from $X_k$, represented as a set $\{X_k, X_{k+1}, \ldots, X_{k+p-1}\}$ can be aggregated to give a single proximity decisions $Y_k$.

$$Y_k = \begin{cases} \text{near, if } n(X_i = \text{near}) > n(X_i = \text{far}), \text{ where } k \leq 1 \leq k + p - 1 \\ \text{far, otherwise} \end{cases}$$

where $n(X_i=\text{near})$ is the number of elements in the set with decision value as 'near' and $n(X_i=\text{far})$ is the number of elements in the set with decision value as 'far. The feedback can be generated whenever any $Y_k=$near is detected. Aggregated decisions are calculated as $Y_k, Y_{k+p}, Y_{k+2p}, Y_{k+3p}$ and so on. The feedback generation can be in the form of a short and distinctive sound, coupled with a tactile feedback (e.g., vibration) based on the device capability (e.g., the primary computing device and/or the one or more secondary computing devices). If the computing device has a display, then a text can be displayed in the form of a notification which informs the user of a possible violation of the social distancing norms defined. The displayed notification may also include an identifier (ID) of the device with respect to which the violation of social distancing has been detected, decision of which can rely with the implementing authority. The aggregated proximity decisions between the two devices can also be transmitted wirelessly over to a server machine, wherein such information can be used for the purpose of tracing a continuous chain of proximity among the users and for further processing and analysis. This can be beneficial in tracing the chain of possible infections in case the system is used in the cases of pandemics like the recent COVID-19.

Wireless transmission quality degrades as the distance between the peers increases. RSSI is the primary parameter exhibited by wireless transmission which directly reflects this degradation in the form of strength of the signal perceived at the receiving end. For a direct estimation of proximity or distance between a single pair of two given devices, as required in a social distancing scenario (in contrast to a group of pairs as used in the conventional approaches), the RSSI proves to be a very definite, albeit high variance measure. Conventional systems and methods have used RSSI value itself, or its derived features in abundance to make distance/proximity decisions between two devices but implementing either machine learning based models or variations of distance-RSSI equations. In this thought-process, the idea of jitters and variability created in arrival time of the packets with change in distance are ignored, since this is a purely temporal parameter, in contrast to RSSI which is a spatial parameter. Therefore, present disclosure provides systems and methods that fuse both temporal and spatial parameters from different spaces altogether (into a set of spatio-temporal features) and use the fused features in a mathematical model to make absolute proximity decisions between every pair of visible devices is hence very non-obvious. In doing so, system and method of the present disclosure not only present this notion of using spatio-temporal features with a machine learning model to be used on every device (moving/not moving) ubiquitously, but also presents applied results and direct comparisons of accuracy achieved by adding temporal features to the spatial-only RSSI features versus using RSSI and derived features alone.

Further, free-space propagation equations are not suited for real-world indoor applications due to multi-path and non-line of sight scenarios. Hence, usually environment specific equations are used where parameters are empirically derived for each environment. While this is good for applications like indoor tracking where environment is fixed, this is not good for peer-to-peer applications where both parties are moving across a variety of environments. Therefore, present disclosure provides system and method wherein a model is implements which can stand the test of ubiquity. Machine Learning (ML) gives an opportunity to solve the above-mentioned technical problems. From state-of-the-art literature it is known that RSSI as well as inter-packet intervals correlate with distance. However, building a model for proximity still remains non-trivial due to the following reasons: 1. How to handle temporal variations in RSSI even if both transmitter and receiver are static in a given environment due to spatial frequency of RSSI? 2. If RSSI is treated as a time-series how to deal with its sporadic nature? How to design time-windows? 3. How to use the temporal information in the model along with RSSI derived features? 4. Since RSSI depends on transmitter(s), receiver(s), and environment(s) (e.g., indoor, outdoor, etc.), how to make the model space and device invariant?

The present disclosure and its system and methods solve the above-mentioned technical problems via features design and model selection approaches wherein (i) first order statistics of RSSI are used that are time invariant to certain degree wherein which of the first order statistical properties of RSSI data that correlate better with space than time are identified, and then these are used in the feature vector that is created/generated, (ii) non-fixed time-windows: The time windows are not of equal time but of equal number of samples—RSSI data is received in non-uniform sampling and since radios/transmitter(s)/transceivers do not transmit continuously to save power, a very sporadic time-series is obtained. Hence, instead of taking a fixed time or overlapping windows, present disclosure and its system and method used windows with fixed number of samples, i.e., RSSI values. This is counter intuitive to any temporal decision making process, (iii) use jitter information as augmented features to RSSI based feature, due to RSSI and time not being independent entities, the system and method of the present disclosure compute features from time-axis that do not correlate with RSSI features (wherein RSSI and time-based features are combined which is a non-trivial solution) because RSSI is a function of time and it is observed that addition of dependent features causes instability in a machine learning (ML) model. Hence, via the experimental results, due care has been taken by the present disclosure and its system and method to choose RSSI features that are time invariant and temporal features which do not capture the time-axis information but rather the jitter, and (iv) train the model on "mixed" data with various devices and environment and use a normalization mechanism to bring them to same scale—since RSSI vary between environment(s), from device to device and between power levels. The present disclosure has implemented the following normalization techniques to scale the data as depicted below by way of examples and such examples shall not be construed as limiting the scope of the present disclosure.

a) Take RSSImax=−30 and RSSImin=−100
b) Ignore/disregard all RSSI<−100
c) RSSInorm=(RSSImax−RSSI)/(RSSImax−RSSImin)
d) −100 and −30 are just one implementation involving data packets (e.g., BLE data packets), the values change for different radio/device types based on their configuration and capabilities.

The present disclosure and its system and method can be implemented by enterprise/entities/organizations/institutes to enforce social distancing among their set of population. Since the system and method can be implemented for social distancing or monitoring proximity between a plurality of computing devices, decisions such as sharing of proximity data, hiding user identities etc., rely solely with the relevant administrative authorities.

The system and method when implemented in computing devices are configured to produce a persistent notification on device's display screen so that the user is kept informed about a status. On detecting proximity with another device, a generalized alert notification may be (or is) triggered and displayed on device's display screen about ensuring social distancing without divulging any information regarding the device(s) detected in the vicinity. Device identifications which are shared over advertising/data packets ($I_j$), are hashed with the hashing information available on the server, with the proximity events transmitted to the server as soon as they are generated for a real-time tracing. Another data protocol can be executed where identifications, in the form of random tokens (e.g., Bluetooth® tokens) can be used, with proximity events saved on the device itself, and shared with the authorities only when required. Furthermore, though the present disclosure provides systems and methods for monitoring proximity between the plurality of computing devices in pandemic like scenarios, it is to be understood by a person having ordinary skill in the art or person skilled in the art that such scenario shall not be construed as limiting the scope of the present disclosure and the system and method of the present disclosure can be utilized and implemented in other application scenarios wherein proximity between devices is to be monitored (e.g., event, social network, conferences, and the like).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may

What is claimed is:

1. A processor implemented method for real-time monitoring of proximity between a plurality of computing devices, comprising:
   continually transmitting in real-time, by a primary computing device, one or more data packets, via a communication channel;
   continually receiving in real-time, by the primary computing device, a unique sequence of data packets from one or more secondary computing devices;
   identifying in real-time, by the primary computing device, (i) a Received Signal Strength Indicator (RSSI) and (ii) a time difference (TD) between arrival instances of a current data packet and a previous data packet comprised in the continually received sequence of data packets from the one or more secondary computing devices;
   computing in real-time, by the primary computing device, a plurality of statistical features based on the identified RSSI and the TD;
   creating in real-time, by the primary computing device, a feature vector using one or more of the plurality of computed statistical features, wherein the one or more of the plurality of computed statistical features comprise one or more RSSI based statistical features, and one or more temporal statistical features; and
   classifying in real-time based on the feature vector, via a pre-trained binary classifier comprised in the primary computing device, each of the one or more secondary computing devices as a computing device that is either within a proximity of the primary computing device or outside of the proximity of the primary computing device.

2. The processor implemented method of claim 1, wherein the one or more RSSI based statistical features comprise at least one of (i) an average value, (ii) a standard deviation, (iii) a minimum value, (iv) a maximum value, and (v) a median value of an identified RSSI of one or more data packets belonging to a specific time window from the continually received sequence of data packets from the one or more secondary computing devices.

3. The processor implemented method of claim 1, wherein the one or more temporal based statistical features comprise at least one of (i) an average value, (ii) a standard deviation, (iii) a minimum value, (iv) a maximum value, and (v) a median value of a time difference between arrival instances of a current data packet and a previous data packet belonging to a specific time window from the continually received sequence of data packets from the one or more secondary computing devices.

4. The processor implemented method of claim 1, wherein the proximity of the primary computing device corresponds to a physical presence of the one or more secondary computing devices within a pre-defined radius of the primary computing device.

5. The processor implemented method of claim 1, wherein each of the one or more secondary computing devices and the primary computing device are either fixed or moving during the real-time monitoring of proximity.

6. A primary computing device for real-time monitoring of proximity between a plurality of computing devices, comprising:
   a memory storing instructions;
   one or more communication interfaces; and
   one or more hardware processors coupled to the memory via the one or more communication interfaces, wherein the one or more hardware processors are configured by the instructions to:
   continually transmit in real-time one or more data packets, via a communication channel;
   continually receive in real-time a unique sequence of data packets from one or more secondary computing devices; identify in real-time (i) a Received Signal Strength Indicator (RSSI) and (ii) a time difference (TD) between arrival instances of a current data packet and a previous data packet comprised in the continually received sequence of data packets from the one or more secondary computing devices;
   compute in real-time a plurality of statistical features based on the identified RSSI and the TD;
   create in real-time a feature vector using one or more of the plurality of computed statistical features, wherein the one or more of the plurality of computed statistical features comprise one or more RSSI based statistical features, and one or more temporal statistical features; and
   classify in real-time based on the feature vector, via a pre-trained binary classifier comprised in the primary computing device, each of the one or more secondary computing devices as a computing device that is either within a proximity of the primary computing device or outside of the proximity of the primary computing device.

7. The primary computing device of claim 6, wherein the one or more RSSI based statistical features comprise at least one of (i) an average value, (ii) a standard deviation, (iii) a minimum value, (iv) a maximum value, and (v) a median value of an identified RSSI of one or more data packets belonging to a specific time window from the continually received sequence of data packets from the one or more secondary computing devices.

8. The primary computing device of claim 6, wherein the one or more temporal based statistical features comprise at least one of (i) an average value, (ii) a standard deviation, (iii) a minimum value, (iv) a maximum value, and (v) a median value of a time difference between arrival instances of a current data packet and a previous data packet belonging to a specific time window from the continually received sequence of data packets from the one or more secondary computing devices.

9. The primary computing device of claim 6, wherein the proximity of the primary computing device corresponds to a physical presence of the one or more secondary computing devices within a pre-defined radius of the primary computing device.

10. The primary computing device of claim 6, wherein each of the one or more secondary computing devices and the primary computing device are either fixed or moving during the real-time monitoring of proximity.

11. A computer program product comprising a non-transitory computer readable medium having a computer readable program embodied therein, wherein the computer readable program, when executed on a primary computing device causes the primary computing device to perform a processor implemented method for real-time monitoring of proximity between a plurality of computing devices comprising:
- continually transmitting in real-time, by the primary computing device, one or more data packets, via a communication channel;
- continually receiving in real-time, by the primary computing device, a unique sequence of data packets from one or more secondary computing devices;
- identifying in real-time, by the primary computing device, (i) a Received Signal Strength Indicator (RSSI) and (ii) a time difference (TD) between arrival instances of a current data packet and a previous data packet comprised in the continually received sequence of data packets from the one or more secondary computing devices;
- computing in real-time, by the primary computing device, a plurality of statistical features based on the identified RSSI and the TD;
- creating in real-time, by the primary computing device, a feature vector using one or more of the plurality of computed statistical features, wherein the one or more of the plurality of computed statistical features comprise one or more RSSI based statistical features, and one or more temporal statistical features; and
- classifying in real-time based on the feature vector, via a pre-trained binary classifier comprised in the primary computing device, each of the one or more secondary computing devices as a computing device that is either within a proximity of the primary computing device or outside of the proximity of the primary computing device.

12. The computer program product comprising a non-transitory computer readable medium of claim 11, wherein the one or more RSSI based statistical features comprise at least one of (i) an average value, (ii) a standard deviation, (iii) a minimum value, (iv) a maximum value, and (v) a median value of an identified RSSI of one or more data packets belonging to a specific time window from the continually received sequence of data packets from the one or more secondary computing devices.

13. The computer program product comprising a non-transitory computer readable medium of claim 11, wherein the one or more temporal based statistical features comprise at least one of (i) an average value, (ii) a standard deviation, (iii) a minimum value, (iv) a maximum value, and (v) a median value of a time difference between arrival instances of a current data packet and a previous data packet belonging to a specific time window from the continually received sequence of data packets from the one or more secondary computing devices.

14. The computer program product comprising a non-transitory computer readable medium of claim 11, wherein the proximity of the primary computing device corresponds to a physical presence of the one or more secondary computing devices within a pre-defined radius of the primary computing device.

15. The computer program product comprising a non-transitory computer readable medium of claim 11, wherein each of the one or more secondary computing devices and the primary computing device are either fixed or moving during the real-time monitoring of proximity.

\* \* \* \* \*